United States Patent
Ortega

(10) Patent No.: US 7,418,756 B1
(45) Date of Patent: Sep. 2, 2008

(54) FASTENER THREAD CLEANING APPARATUS

(76) Inventor: Raul G. Ortega, P.O. Box 541, New Carlisle, IN (US) 46552

( * ) Notice: Subject to any disclaimer, the term of this patent is extended or adjusted under 35 U.S.C. 154(b) by 57 days.

(21) Appl. No.: 11/503,887

(22) Filed: Aug. 15, 2006

(51) Int. Cl.
*A47L 13/02* (2006.01)
*B21J 13/02* (2006.01)

(52) U.S. Cl. .................. 15/104.001; 470/207; 408/227

(58) Field of Classification Search ............ 15/104.001; 470/186, 190, 209, 185, 187; 408/199, 221, 408/227, 207
See application file for complete search history.

(56) References Cited

U.S. PATENT DOCUMENTS

| | | | | |
|---|---|---|---|---|
| 522,471 | A | * | 7/1894 | Kohler ........................... 7/129 |
| 816,570 | A | * | 4/1906 | Edmonds ...................... 72/71 |
| 1,042,318 | A | * | 10/1912 | Chamberlain ................. 7/139 |
| 1,521,647 | A | * | 1/1925 | Perry ......................... 408/188 |
| 1,606,186 | A | * | 11/1926 | Schaefer et al. ............. 470/209 |
| 4,346,491 | A | | 8/1982 | Kraus et al. |
| 4,603,605 | A | | 8/1986 | Miller |
| 5,288,181 | A | * | 2/1994 | Pinkston ..................... 408/1 R |
| D375,667 | S | | 11/1996 | Macor |
| 6,206,620 | B1 | | 3/2001 | Burns |
| 6,921,236 | B2 | | 7/2005 | Rahberger |
| 2003/0091401 | A1 | | 5/2003 | Thompson |

\* cited by examiner

*Primary Examiner*—David B Thomas

(57) ABSTRACT

A fastener thread cleaning apparatus includes a first arm and a second arm each having a first end and a second end. The first and second arms are pivotally coupled together adjacent to the first ends to define a pair of jaws. An abutting side of each of the of the first and second arms is defined and abut each other when the pair of jaws is positioned in the closed position. Each of the of the abutting sides has a semi-circular depression therein. The depressions are alignable to define an aperture, which is threaded. The pair of jaws may be closed around a bolt to threadably engage the bolt with the aperture. The pair of jaws is positioned between a head and an end of the bolt and the bolt rotated to move the pair of jaws toward the end of the bolt.

7 Claims, 6 Drawing Sheets

FASTENER THREAD CLEANING APPARATUS

BACKGROUND OF THE INVENTION

1. Field of the Invention

The present invention relates to cleaning devices and more particularly pertains to a new cleaning device for removing debris from the threads of a fastener such as a screw or bolt.

2. Description of the Prior Art

The use of cleaning devices is known in the prior art. While these devices fulfill their respective, particular objectives and requirements, the need remains for a device that is configured for removing debris from the threads of a bolt. In particular, the device should be configured for securely engaging a bolt so that the threads can be properly cleaned.

SUMMARY OF THE INVENTION

The present invention meets the needs presented above by generally comprising a first arm and a second arm each having a first end and a second end. The first and second arms are pivotally coupled together adjacent to the first ends to define a pair of jaws that are selectively positioned in a closed position abutting each other or in an open position spaced from each other. An abutting side of each of the of the first and second arms is defined and abut each other when the pair of jaws is positioned in the closed position. Each of the of the abutting sides has at least one semi-circular depression therein. The at least one depression in the first arm is alignable with the at least one depression in the second arm to define at least one aperture through the pair of jaws when the pair of jaws is in the closed position. The at least one aperture is threaded. The pair of jaws may be closed around a bolt to threadably engage the bolt with the at least one aperture. The pair of jaws is positioned between a head and an end of the bolt. The bolt is rotated to move the pair of jaws toward the end of the bolt.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
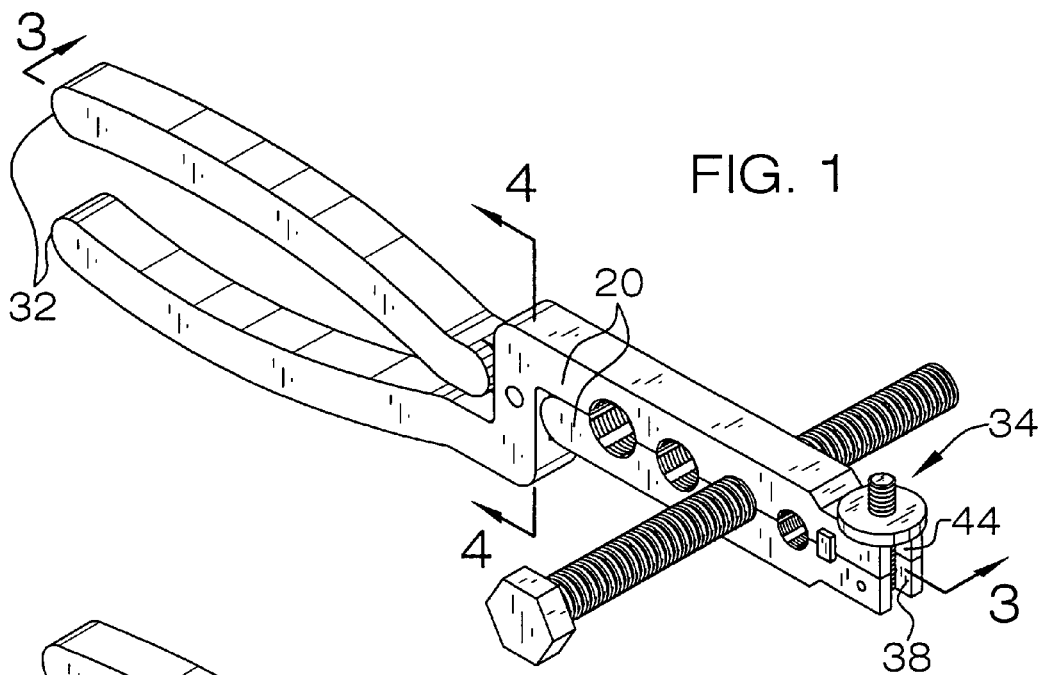
FIG. 1 is a perspective view of a first embodiment of a fastener thread cleaning apparatus according to the present invention.

With reference now to the drawings, and in particular to FIGS. 1 through 9 thereof, a new cleaning device embodying the principles and concepts of the present invention and generally designated by the reference numeral 10 will be described.

As best illustrated in FIGS. 1 through 9, the fastener thread cleaning apparatus 10 generally comprises a first arm 12 and a second arm 14. Each of the first 12 and second 14 arms each has a first end 16 and a second end 18. The first 12 and second 14 arms are pivotally coupled together adjacent to the first ends to define a pair of jaws 20 that are selectively positioned in a closed position abutting each other or in an open position spaced from each other. An abutting side 22 of each of the of the first 12 and second 14 arms is defined and abut each other when the pair of jaws 20 is positioned in the closed position. Each of the of the abutting sides 22 has a plurality of semi-circular depressions 24 therein. Each of the depressions 24 in the first arm 12 is alignable with one of the depressions 24 in the second arm 14 to define apertures 26 extending through the pair of jaws 20 when the pair of jaws 20 is in the closed position. The apertures 26 each have a different diameter with respect to each other. The apertures 26 are each threaded. Each of the apertures 26 includes non-threaded sections 28 interspersed between threaded sections 30.

Figure 2:
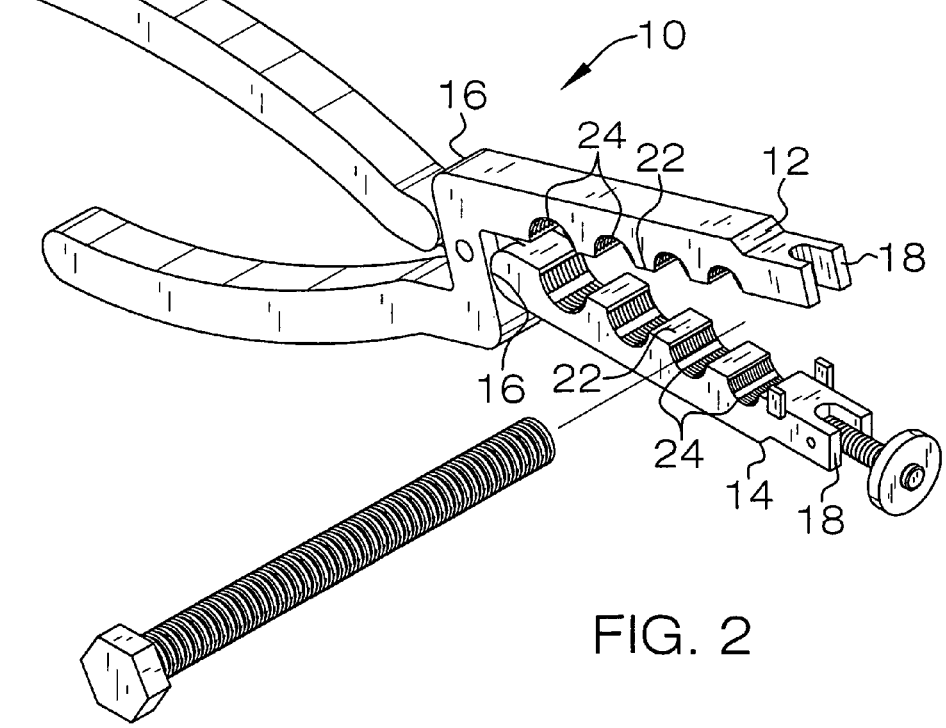
FIG. 2 is a perspective view of a first embodiment of the present invention.
Figure 3:
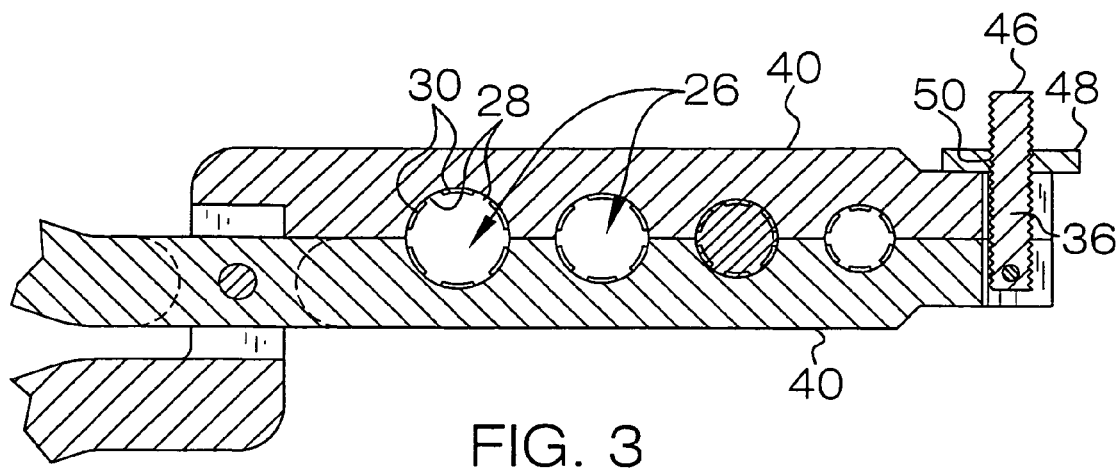
FIG. 3 is a cross-sectional view taken along line 3-3 of FIG. 1 of the present invention.
Figure 4:
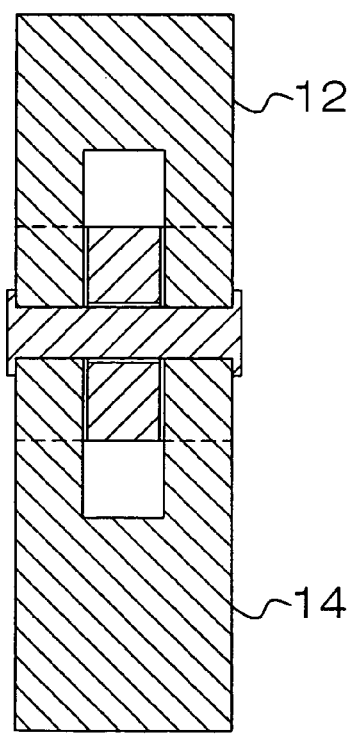
FIG. 4 is a cross-sectional view taken along line 4-4 of FIG. 1 of the present invention.
Figure 5:
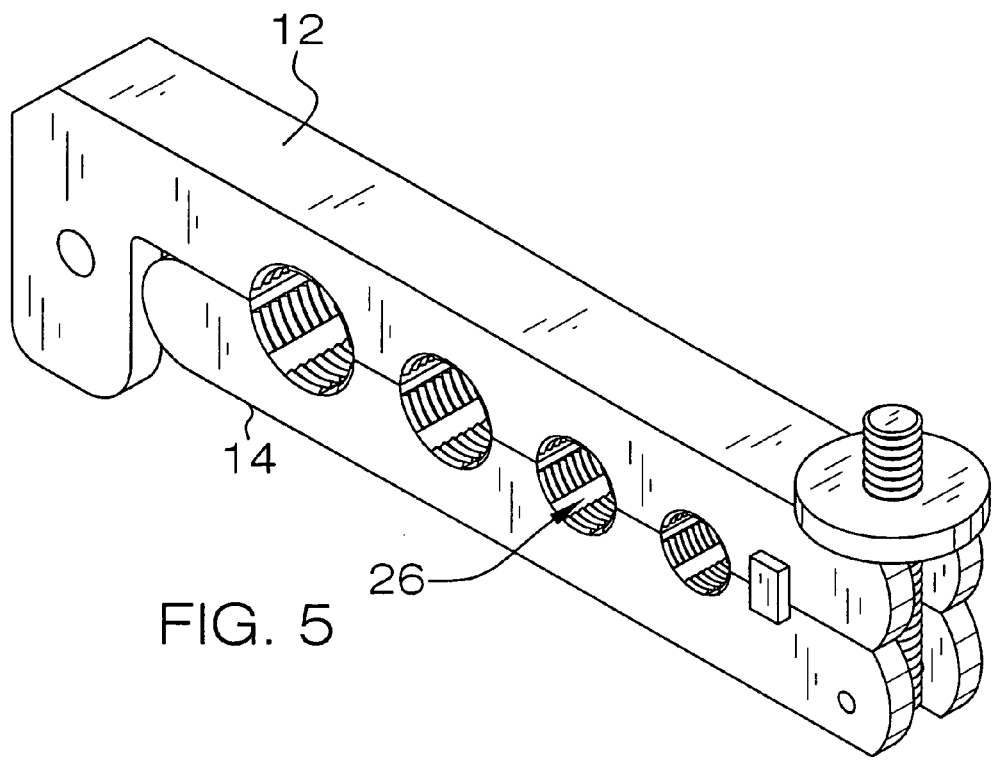
FIG. 5 is a perspective view of a second embodiment of the present invention.
Figure 6:
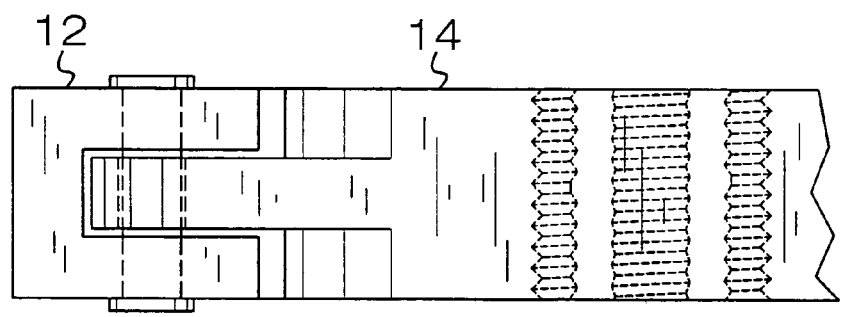
FIG. 6 is a top enlarged view of the second embodiment of the present invention.
Figure 7:
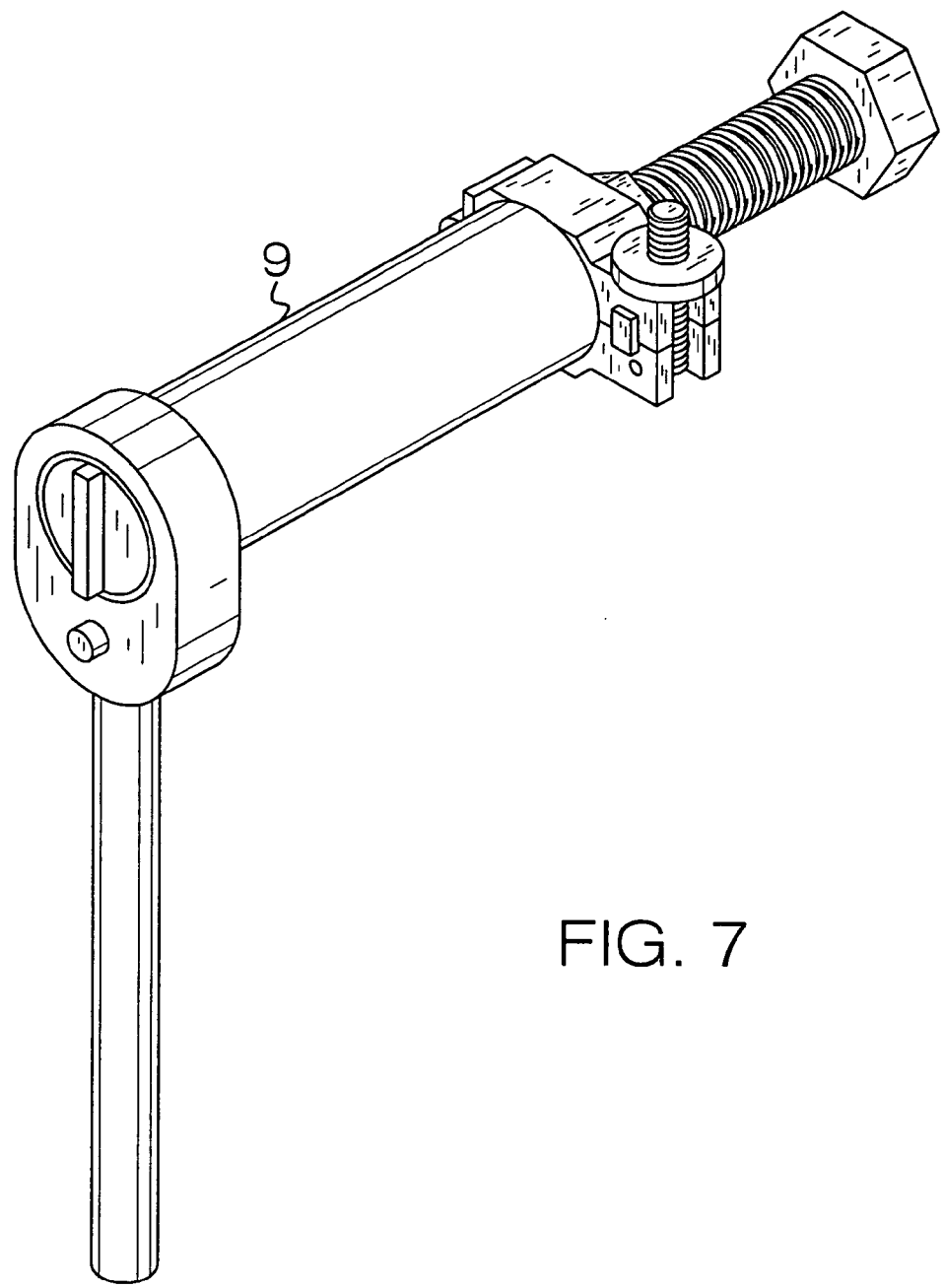
FIG. 7 is a perspective in-use view of a third embodiment of the present invention.
Figure 8:
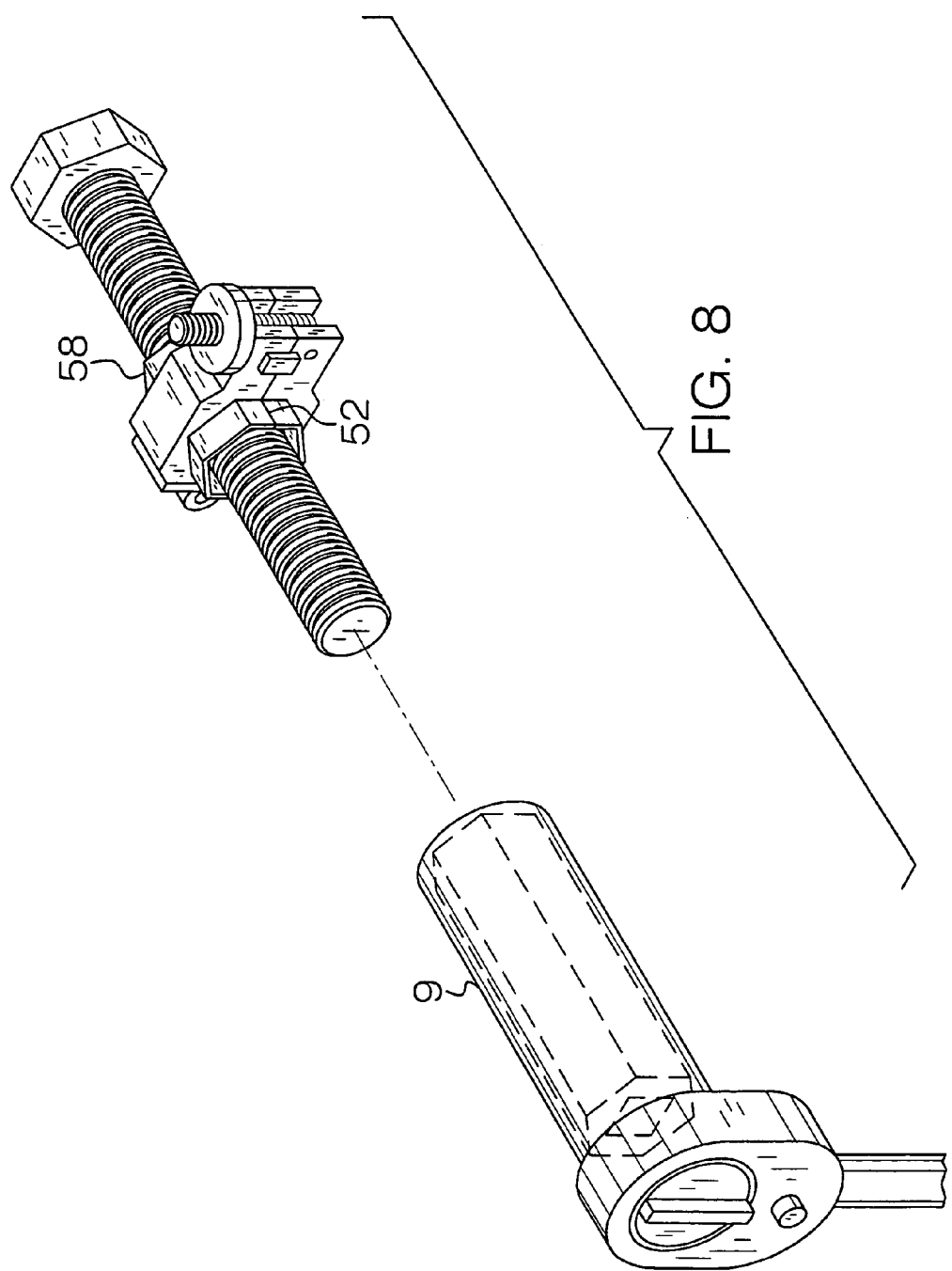
FIG. 8 is a perspective view of the third embodiment the present invention.
Figure 9:
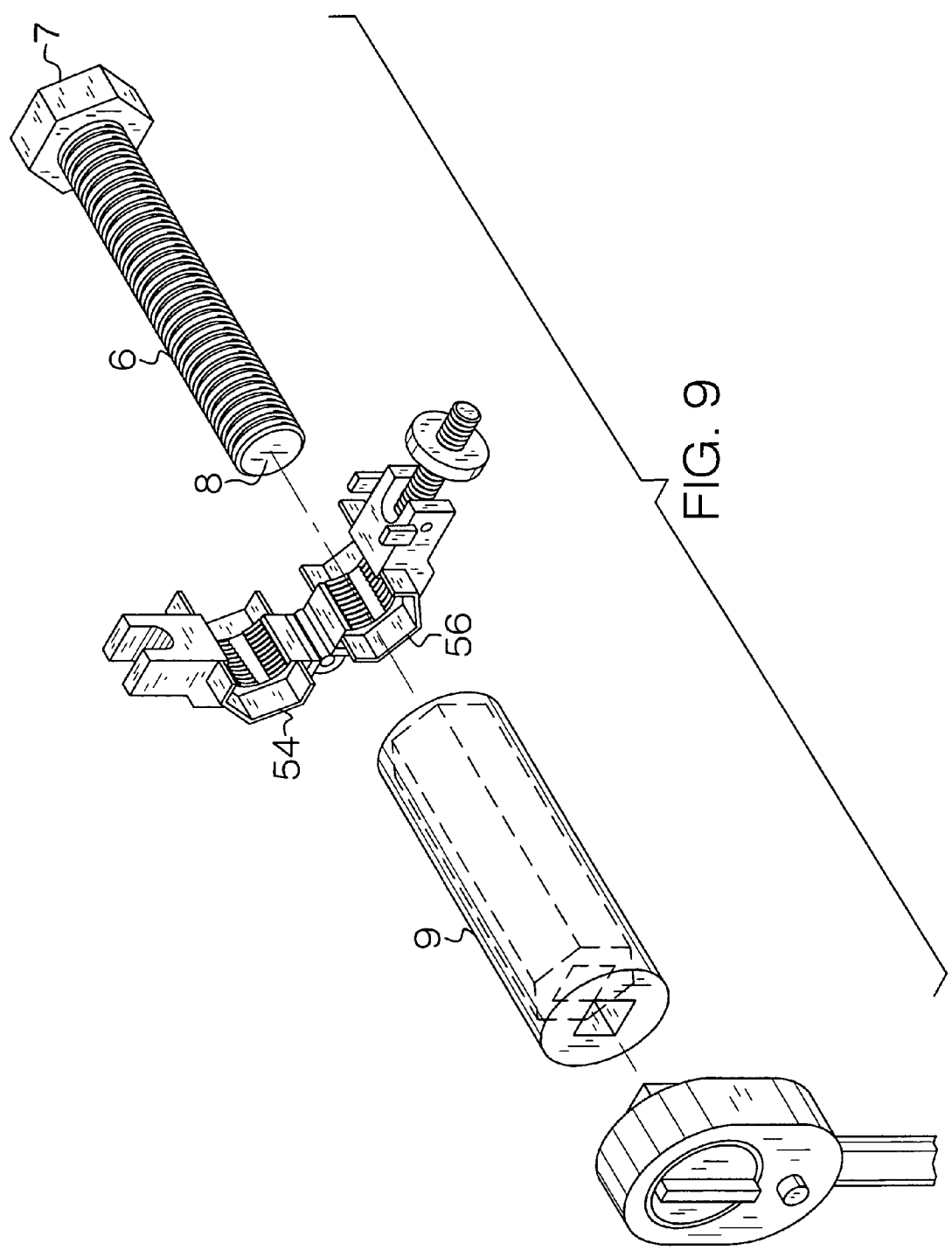
FIG. 9 is a perspective view of the third embodiment of the present invention.

A first embodiment of the apparatus 10, shown in FIGS. 1 and 2, includes handles 32 attached to the first ends 12. A second embodiment is shown in FIGS. 5 and 6 and does not include handles 32. A third embodiment is shown in FIGS. 7-9 and only includes one aperture 26.

A locking member 34 is mounted on the pair of jaws 20 for selectively securing the pair of jaws 20 in the closed position. The locking member 34 comprises a rod 36 extending into a notch 38 in the second end 18 of the second arm 14 and is pivotally coupled to the second arm 14. Each of the first 12 and second 14 arms has an outer side 40 positioned opposite of a corresponding one of the abutting sides 22. The notch 38 in the second arm 14 extends through the outer side 40 and abutting side 22 of the second arm 14. The rod 36 is selectively positionable into a notch 44 extending into the second end 18 of the first arm 12. A free end 46 of the rod 36 extends outwardly away from the outer side 40 of the first arm 12. The rod 36 is threaded. A disc 48 has an opening 50 extending therethrough. The opening 50 is threaded. The rod 36 extends through and is threadably coupled to the disc 48. The disc 48 may be abutted against the outer side 40 of the first arm 12 when the pair of jaws 20 is in the closed position to secure the pair of jaws 20 in the closed position.

In the third embodiment, a perimeter wall 52 is attached to the pair of jaws 20 and extends around the aperture 26 when the pair of jaws 20 is positioned in the closed position. The perimeter wall 52 includes a first portion 54 attached to the first arm 12 and a second portion 56 attached to the second arm 14. The perimeter wall 52 has a hexagonal shape and has a size substantially equal to the size of the bolt head. A second perimeter wall 58 may be positioned on an opposite side of the jaws 20. The perimeter wall 52 allows a socket 9 to be attached to the jaws 20 for easy rotation of the jaws 20 with respect to a bolt 6.

In use, the pair of jaws 20 may be closed around a bolt 6 to threadably engage the bolt 6 with one of the apertures 26. The pair of jaws 20 is positioned between a head 7 and an end 8 of the bolt 6. The bolt 6 is then rotated to move the pair of jaws 20 toward the end 8 of the bolt 6. As the jaws 20 are rotated with respect to the bolt 6, the threads 30 in the apertures 26 clean the threads of the bolt 8. The non-threaded sections 28 collect the debris removed from the bolt 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cleaning tool for cleaning threads of a bolt, said tool comprising:

a first arm and a second arm, each of said first and second arms having a first end and a second end, said first and second arms being pivotally coupled together adjacent to said first ends to define a pair of jaws being selectively positioned in a closed position abutting each other or in an open position spaced from each other, an abutting side of each of said of said first and second arms being defined and abutting each other when said pair of jaws is positioned in said closed position, each of said abutting sides having at least the semi-circular depression therein, said at least one depression in said first arm being alignable with said at least one depression in said second arm to define at least one aperture through said pair of jaws when said pair of jaws is in said closed position, said at least one aperture being threaded;

a perimeter wall being attached to said pair of jaws and extending around said at least one aperture when said pair of jaws is positioned in said closed position, said perimeter wall including a first portion attached to said first arm and a second portion attached to said second arm, said perimeter wall having a hexagonal shape and having a size substantially equal to the size of the bolt head; and wherein said pair of jaws may be closed around a bolt to threadably engage the bolt with said at least one aperture, said pair of jaws being positioned between a head and an end of the bolt, wherein the bolt is rotated to move said pair of jaws toward the end of the bolt.

2. The tool according to claim 1, wherein said at least one aperture includes non-threaded sections interspersed between threaded sections.

3. The tool according to claim 2, further including a locking member being mounted on said pair of jaws for selectively securing said pair of jaws in said closed position.

4. The tool according to claim 3, wherein said locking member comprises:

a rod extending into a notch in said second end of said second arm and being pivotally coupled to said second arm, each of said first and second arms having an outer side positioned opposite of a corresponding one of said abutting sides, said notch in said second arm extending through said outer and abutting sides of said second arm, said rod being selectively positionable into a notch extending into said second arm of said first arm, wherein a free end of said rod extends outwardly away from said outer side of said first arm, said rod being threaded; and a disc having an opening extending therethrough, said opening being threaded said rod extending through and being threadably coupled to said disc, wherein said disc may be abutted against said outer side of said first arm when said pair of jaws is in said closed position to secure said pair of jaws in said closed position.

5. The tool according to claim 1, wherein said at least one aperture includes non-threaded sections interspersed between threaded sections.

6. The tool according to claim 5, further including a locking member being mounted on said pair of jaws for selectively securing said pair of jaws in said closed position.

7. The tool according to claim 1, further including a locking member being mounted on said pair of jaws for selectively securing said pair of jaws in said closed position.

* * * * *